Dec. 14, 1965                A. TRINKLER                3,223,103
            REGULATING DEVICE INCLUDING A DISTRIBUTOR
                 HAVING DOUBLE-ACTING KNIFE-EDGES
Filed March 14, 1963                              3 Sheets-Sheet 1

INVENTOR,
ALFRED TRINKLER
BY Watson, Cole, Grindle & Watson
ATTORNEYS

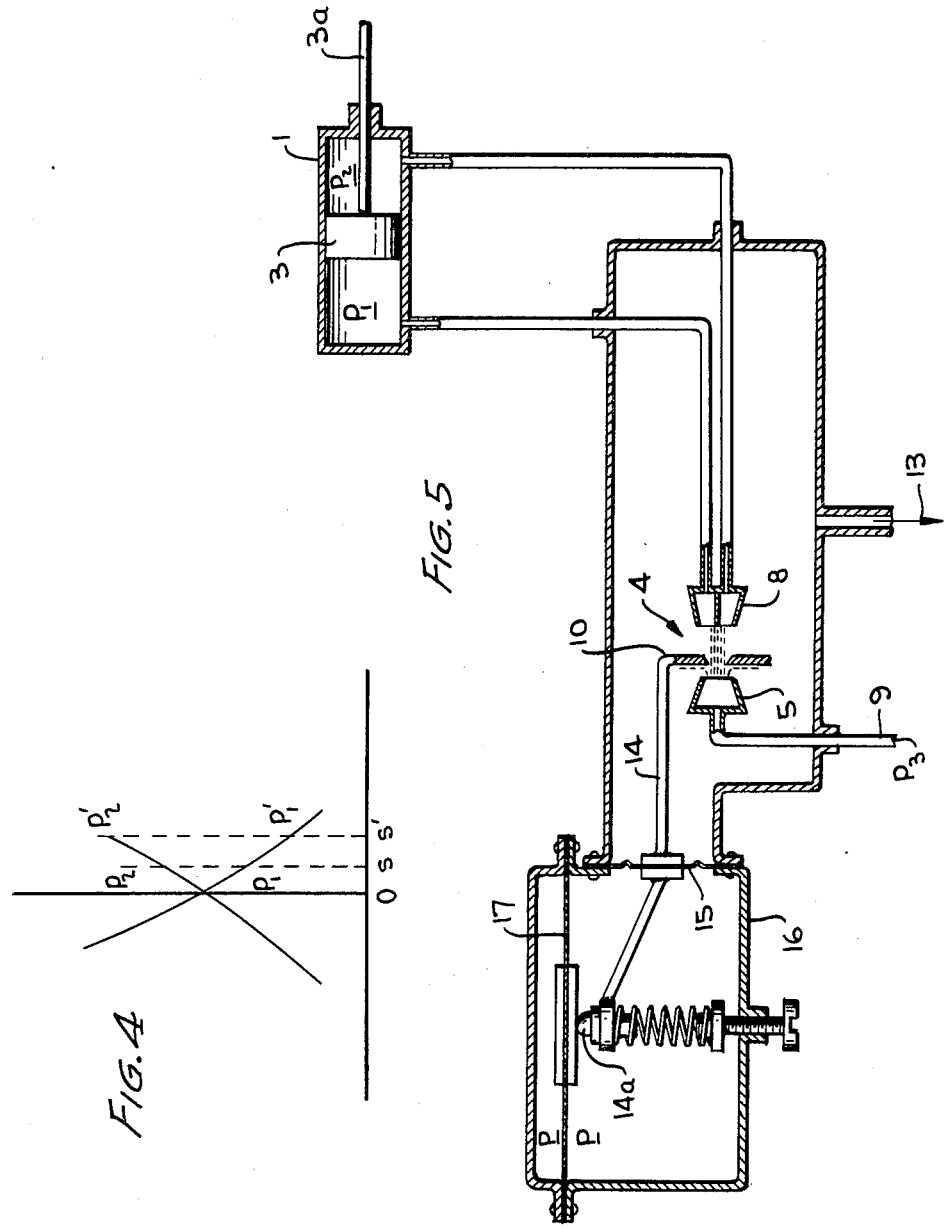

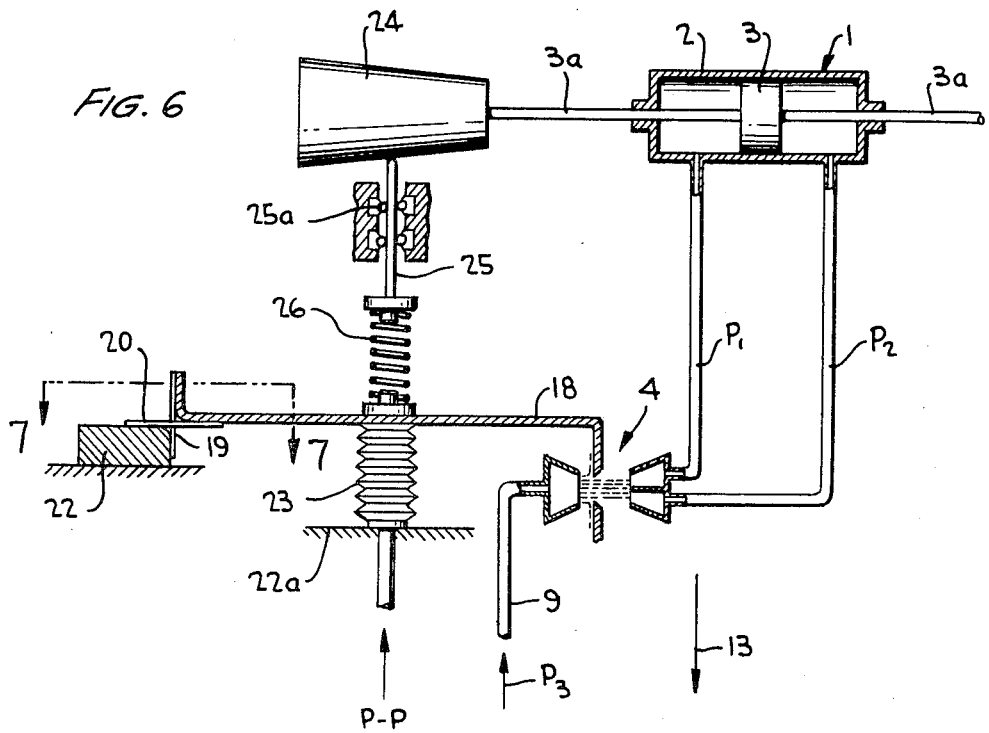
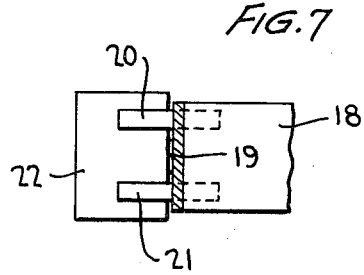

United States Patent Office 3,223,103
Patented Dec. 14, 1965

3,223,103
REGULATING DEVICE INCLUDING A DISTRIBUTOR HAVING DOUBLE-ACTING KNIFE-EDGES
Alfred Trinkler, Dammarie-les-Lys, France, assignor to Societe Nationale d'Etude et de Construction de Moteurs d'Aviation, Paris, Seine, France, a company of France
Filed Mar. 14, 1963, Ser. No. 265,158
Claims priority, application France, Mar. 17, 1962, 891,417
2 Claims. (Cl. 137—83)

The invention relates to regulating devices comprising a servomotor actuated by the difference between two pressures and concerns more particularly a device of this kind in which control of the pressures is effected by displacement of a free fluid stream.

Such servomotors comprise a movable member, the movements of which are caused by the difference between the two pressures and can be utilised, for example, to actuate a regulating member. This movable member is generally fast with a movable or deformable partition separating two chambers each of which is subjected to one of the control pressures. The most common form of embodiment comprises a free piston sliding in a cylinder, but the partition may also be a diaphragm or a bellows. In the event of the movable member being required to move in rotary fashion, it is possible to use a rotary servomotor comprising, for example, a cylinder closed at its two ends and provided with a fixed radial partition and a spindle fast with a rotary radial vane or blade defining with the fixed partition and the walls of the cylinder two chambers of variable volume.

The distributor associated with the servomotor comprises a movable member, the displacement of which controls the variation in the pressures actuating the said servomotor. If the regulation is to be of the follow-up type, it includes a reaction chain connecting the movable member of the servomotor to the movable member of the distributor. This connection is preferably bi-univocal, that is to say to every impulse value acting on the movable member of the distributor there corresponds a single position of equilibrium of the movable member of the servomotor.

In order to obtain good regulation, more particularly in the case of follow-up regulation arrangements, it is necessary for the distributor not only to act on one of the two pressures acting on the servomotor, but to cause the two pressures to vary concomitantly, according to a given law, as a function of the position of the movable member of the said distributor.

Regulating devices are known which fulfill the conditions mentioned above, that is to say in which the distributor controls, concomitantly and according to a given law, the two pressures acting on the servomotor. Such a device comprises a movable control member adapted to be connected in bi-univocal manner by a reaction chain to the movable member of the said servomotor. These devices, the most common form of which comprises a distributing slide valve, generally utilise the co-operation of orifices or ports with shutters and this results in various parasitic effects (friction of moving parts, inertia, etc.) which are detrimental to the precision of the follow-up action or of the law governing the pressures.

It has already been sought to get rid of these causes of lack of precision by controlling the pressures by a leakage, the rate of flow of which is dependent on the movement of a contact piece in front of a nozzle, or else by controlling a pressure downstream of a nozzle by means of a deflector moving in the path of a free fluid stream directed towards the nozzle. However, it is possible in this way to control only one of the two pressures actuating the servomotor.

It is moreover known to control the two pressures actuating the servomotor in concomitance, these two pressures being created downstream of two nozzles receiving the jet of fluid emitted by a third nozzle, which is movable. Such a device poses serious problems of construction, because it is difficult to arrange for the fluid to arrive at the movable nozzle under fluid-tight conditions and this necessarily involves friction on the movement of the movable nozzle, this friction introducing lack of accuracy.

The invention has for its object the provision of a regulating device which will fulfill the above-mentioned conditions, without exhibiting the defects of known devices.

According to the invention, the distributor comprises a double-acting movable deflector interposed between a nozzle supplied with fluid and two receiving orifices which are disposed one beside the other opposite the said nozzle, the said deflector adapted to be displaced as a function of the regulation input signal and having two sharp edges facing one another so that, in accordance with the position of the deflector they partially intercept the jet emitted by the nozzle and deflect it towards one or the other of the receiving orifices, pressures actuating the servomotor thus being created downstream of the receiving orifices.

The description which follows, which is given by way of example only and with reference to the accompanying drawings, will enable the various features of the invention and the method of carrying the invention into effect to be clearly understood.

FIGURE 4 is a graph showing the variations in the pressures actuating the servomotor as a function of the movements of the deflector;

FIGURE 5 shows diagrammatically a device in which the invention is applied to a floating type of regulator, the distributor and the servomotor being seen in vertical section;

FIGURE 6 is a corresponding view of another form of device in which the invention is applied to follow-up regulation; and FIGURE 7 is a partial sectional view on the line VII—VII of FIGURE 6.

Figure 1:
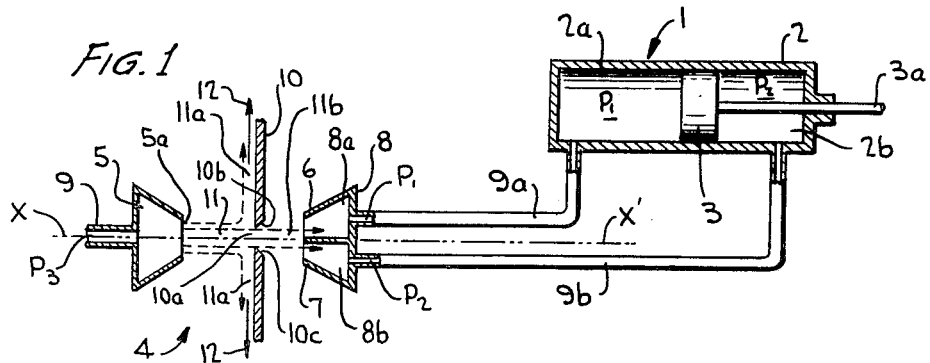
FIGURE 1 shows in diagrammatic vertical section, one form of device constructed in accordance with the invention.

Referring to FIGURE 1, the servomotor 1 shown therein is of the jack type, comprising a cylinder 2 in which there slides a piston 3 defining two chambers 2a and 2b and having a rod 3a designed to act on a regulating member (not shown). The distributor 4 includes a fixed nozzle 5 having an axis X–X' and disposed opposite two adjacent orifices 6 and 7 of a hollow device 8 having two compartments 8a and 8b communicating through pipes 9a and 9b, respectively, with the chambers 2a and 2b of the servomotor. A movable deflector 10 is disposed between the nozzle 5 and the orifices 6, 7. The orifices 6 and 7 are in an end plane at right angles to the horizontal axis X–X'; these orifices and hollow device 8 are symmetrical about this axis X–X'. The deflector 10 is constituted by a plate in which there is formed an elongated orifice 10a having a horizontal upper chamfered edge 10b and a horizontal lower chamfered edge 10c. The deflector 10 is arranged upright, at right angles to the axis X–X′, and is fixed by known means (not shown) so that it can slide vertically under the action of the impulse forming the input signal of the regulator. The nozzle 5 is supplied with fluid at constant pressure $P_3$ (see FIGURE 4) by way of the pipe 9 and emits a cylindrical jet 11, one part 11a of which is intercepted by the deflector 10 while the part 11b passes into the orifice 10a of the deflector.

Figure 3:
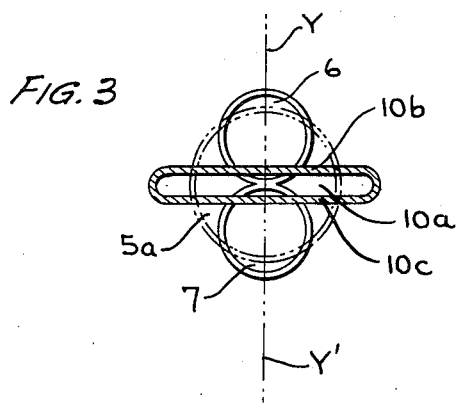
FIGURE 3 shows, on a still larger scale, the projection on to an end plane perpendicular to the general direction of the flow, of the receiving orifice, the contour of the deflector and the orifice of the nozzle.

When the deflector occupies the natural position shown in FIGURES 1 and 3, in which it is located symmetrically with respect to the axis X–X′, the cylindrical jet 11 is intercepted symmetrically by the chamfered edges 10b and 10c which act like knife-edges or cutters, the intercepted portion 11a flowing symmetrically upwards and downwards in the direction of the arrows 12; the unintercepted central portion 11b of the jet 11 is flattened, becoming slightly convergent because of the deflection due to the knife-edges 10b and 10c, and is directed symmetrically towards the two receiving orifices 6 and 7. The two pressures $P_1$ and $P_2$ (FIGURE 4) produced by the incidence of this jet 11b in the compartments 8a and 8b respectively are equal. These two pressures are delivered by the pipes 9a and 9b to the chambers 2a and 2b of the servomotor, where they maintain the piston 3 in equilibrium.

FIGURE 3 shows, by way of example, the cross-sections of the openings of the various elements in this neutral or median position. The outlet cross-section 5a of the nozzle in circular. In the example chosen the orifices 6 and 7 are likewise circular and substantially tangential to one another, their point of contact being located on the axis of the nozzle. The opening 10a of the deflector is elongated horizontally and has, over the whole of its periphery, a chamfered edge forming the upper knife-edge 10b and the lower knife-edge 10c.

Starting from the neutral or middle position shown in FIGURES 1 and 3, it will be understood that the sliding of the deflector 10 upwardly or downwardly causes the pressures $P_1$ and $P_2$, produced in the compartments 8a and 8b respectively, to vary according to a law whose general aspect is shown in the graph of FIGURE 4. In this graph, the pressures $P_1$ and $P_2$ are plotted as ordinates and the movements $s$ of the deflector 10 are plotted as abscissae, the point O corresponding to the central position of the deflector.

In this central position, the flow of that portion 11a of the jet 11 which is deflected by the knife-edges is symmetrical and the jet 11b passing between these knife-edges is also symmetrical; the pressures $P_1$ and $P_2$ are equal, as has been already been seen. As soon as the deflector 10 is made to slide downwardly, however little this may be, the knife-edges 10b and 10c deflect a larger proportion of the jet 11 at the top than at the bottom; moreover, the jet 11b issuing between the knife-edges is suddenly deflected through an appreciable angle in the direction away from the larger of the deflected portions, that is to say, downwardly. The issuing jet 11b, moved off-center and deflected downwardly in this way, enters the orifice 7 over a larger area than it does the orifice 6. The pressure $P_2$ produced in the compartment 8b by the larger cross-section of the incident jet therefore increases while the pressure $P_1$ produced in the compartment 8a by the smaller cross-section of the corresponding incident jet decreases. This arrangement is shown in the graph of FIGURE 4 by the intercept $s$ of the pressures $P_1$ and $P_2$ on the abscissa. The pressures $P_1$ and $P_2$ are delivered by the pipes 9a and 9b to the chambers 2a and 2b of the servomotor 1 and actuate the latter.

Figure 2:
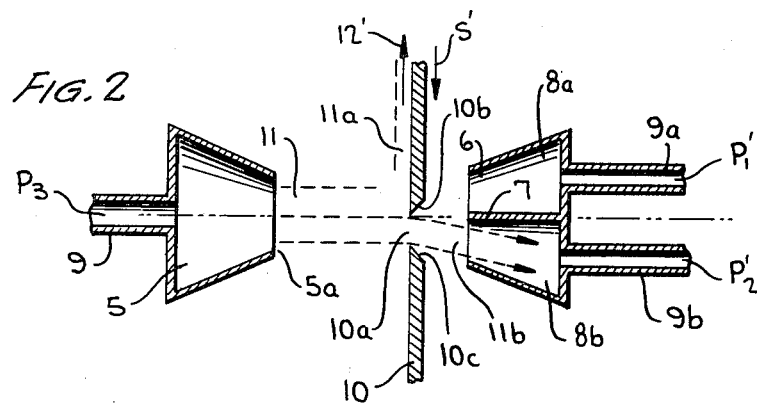
FIGURE 2 is a partial view similar to FIGURE 1, showing the operation of the distributor on a larger scale.

In the position shown in FIGURE 2, the deflector 10 has been caused to slide downwardly by a length $s'$ which is equal to that of the orientated segment shown in the figure and is substantially equal to the maximum possible extent of the sliding action. The upper knife-edge 10b cuts the cylindrical jet 11 asymmetrically, the intercepted portion 11a flowing upwards in the direction of the arrow 12′. The unintercepted portion 11b is deflected downwardly through a considerable angle and is directed almost exclusively toward the lower orifice 7, as is indicated diagrammatically by the broken lines, so as to produce increased pressure $P'_2$ in the compartment 8b. On the other hand, the orifice 6 is almost unaffected by the jet 11b and the pressure $P'_1$ produced in the compartment 8a is very low.

It is obvious that if the deflector 10 is made to slide upwardly there will be obtained, by reason of symmetry, the values of the pressures $P_1$ and $P_2$ shown by the portions of the curves of FIGURE 4 which are located to the left of the ordinate axis.

The law of variation of the pressures $P_1$ and $P_2$ as a function of the displacement $s$ is entirely similar to the law which could be obtained with distribution by means of a slide valve. It is possible to modify this law to a very wide extent by varying the form, the dimensions and the relative arrangement of the nozzle 5, the deflector 10, the orifices 6 and 7 and the receiving device 8, and also by varying the supply pressure $P_3$.

Among the advantages of the device described, there may be mentioned:

the considerable amplifying effect of the distributor, permitting great precision of regulation; as has already been seen, a very weak control signal causing a very small displacement of the deflector produces very considerable asymmetry and, above all, a very considerable deflection of the jet 11b, and, consequently, very appreciable variation of the pressures $P_1$ and $P_2$;

the absence of friction and of reactive force; as the deflector moves at right angles to the incident jet, it receives from the latter, practically speaking, no force capable of disturbing the indications of the input signal;

the independence of the distributor with respect to the ambient temperature and pressure;

the absence of the risk of seizing, which is a drawback of conventional distributors;

simplicity due, in particular, to the fact that parasitic leakages do not play a preponderant part.

The device described is suitable both for pneumatic transmission and for hydraulic transmission, it being possible for the fluid whose pressure P is delivered to the nozzle 5 and whose pressures $P_1$ and $P_2$ actuate the servomotor to be either a gas or a liquid. Moreover, the movable element of the distributor is not a movable nozzle conducting the fluid, as in known systems utilising the displacement of a jet, and consequently neither the problems as overrated with a rotating joint nor the problems of parasitic reaction or of inertia of the jet are posed.

FIGURE 5 shows diagrammatically an example of application of the device described above to floating regulation. In the case in question the regulation is regulation of the cross-section of the nozzle of a jet aircraft as a function of the flying speed or of some other flight parameter. More precisely, the device illustrated permits regulation of the propulsive thrust supplied by the jet engine of an aircraft in its landing approach, as a function of its flying speed, by acting on the nozzle opening with the aid of a piston rod 3a of a servomotor 1 supplied by a distributor 4, in a device as described with reference to FIGURES 1 to 3, the deflector 10 being controlled as a function of this flying speed.

The piston rod 3a actuates a device of known type (not shown) enabling the nozzle cross-section to be varied. The constant pressure $P_3$ supplied to the nozzle 5 by way of the pipe 9 is that of, for example, a liquid. A pipe 13 is provided for discharging the liquid falling from the deflector 10 and from the hollow device 8.

The deflector 10 is fixed to a lever 14 which can be pivoted in dependence upon the speed of the aircraft. This lever is fixed to a corrugated diaphragm 15 forming one wall of a chamber 16 having a diaphragm 17 therein. The end 14a of the lever 14 follows the movement of this diaphragm 17, which is subjected, on the one hand, to the total pressure P and, on the other hand, to the static pressure p and which are taken by a speed monitor (not shown) on the outside of the aircraft. The action of the diaphragm 15 on the lever 14 is equivalent to pivoting the latter about an imaginary axis 14b, the arrangement being such that the lever 14 projects from the chamber 16 in a fluid-tight manner and without friction. The movement imparted to the deflector 10 by the lever 14 is not a true sliding action, but rather curvilinear displacement about the imaginary axis 14b, which displacement, by reason of the length of the arm of the lever and of the small amplitude of the movement, is substantially equivalent to vertical translation.

The apparatus is adjusted so that the deflector 10 is in a neutral position when the aircraft is moving at the desired speed. Any increase in this speed increases the difference $P-p$, with the result that the diaphragm 17 is deformed downwardly, and consequently causing the lever 14 to pivot in a counter-clockwise direction with the end 14a of the lever 14 bearing on this diaphragm. The lever 14 thus raises the deflector 10 and this has the effect of increasing the pressure $P_1$ and reducing the pressure $P_2$; this unbalance of pressures shifts the piston 3 towards the right; the piston rod 3a must therefore act on the nozzle cross-section in the sense which will reduce the thrust. The result is slowing down of the aircraft and the maintenance of the speed of the latter within acceptable limits. In the case of reduction below the desired speed, a similar procedure occurs but in the reverse sense.

FIGURE 6 shows diagrammatically an example of the application of the device described to a regulator having a reaction linkage. The system shown may serve, for example, for regulating or monitoring the approach of an aircraft by acting on the throttle lever. The rod 3a operates the throttle linkage (not shown). The distributor 5 is supplied as in the arrangement described with reference to FIGURE 5, but the lever 18 at the end of which the deflector 10 is fixed is pivotally mounted at its other end, in a frictionless manner by means of three small thin flexible plates 19, 20 and 21. The plate 19 is fixed to one of the vertical faces of a support 22 and to the end 18a of the lever, which has been bent through a right angle and passes between the two plates 20 and 21 which are fixed to one of the horizontal faces of the support and to the lever.

On the lower face of the lever 18 there bears the end of a bellows 23 fixed to a support 22a which is rigidly mounted relatively to the support 22.

The input signal controlling the knife-edge is the differential pressure resulting from the action, on the bellows 23, of the kinetic pressure $P-p$ picked up by a monitor mounted on the outside of the aircraft and introduced into the said bellows, the ambient pressure $P_0$ acting outside the said bellows.

The reaction chain or linkage comprises a cam-member 24 carried by the piston rod 3a of the servomotor and a rod 25 guided for sliding movement at 25a and caused to bear against the cam 24 by a spring 26 which in turn bears against the lever 18.

As in the arrangement of FIGURE 5, acceleration of the aircraft increases the kinetic pressure $P-p$, thus raising the deflector 10 and shifting the rod 3a towards the right; the rod 3a thus operates the throttle lever in the direction to reduce the thrust. At the same time, the rod 3a shifts the cam-member 24 towards the right, there-by pressing the rod 25 downwardly and compressing the spring 26. The latter tends to push the deflector 10 back into the neutral position. Conversely, slowing down of the aircraft causes displacement toward the left of the piston 3, thus operating the throttle lever in the direction to increase the thrust and carrying the cam-member 24 towards the left; the spring 26 biasses the rod 25 upwards so as to keep it always applied against the cam-member, and this has the effect of reducing the pressure exerted by the spring on the lever 18.

In this way there is produced a linkage system which permits continuous adjustment of position of the throttle lever. The precision of the system depends, among other factors, on the slope of the cam 24 and on the force of the spring 26, which can consequently be chosen as a function of the desired precision.

The cam-member 24 can be replaced by a three-dimensional cam, that is to say a cam having a variable meridian profile, driven in rotation around the rod 3a. This arrangement enables the profile of the cam cooperating with the rod 25 to be modified in order to adjust the precision of the regulating system.

It is obvious that the forms of devices described are only examples and that they could be modified, in particular by substituting technical equivalents, without thereby departing from the scope of the invention as defined by the appended claims.

In particular, it is possible to make very many modifications in the form and arrangement of the various elements of the distributor and also in the means used for displacing the deflector in dependence of the input impulses or signals of the regulation. The distributor may be associated with various forms of servomotors and used for all sorts of regulating operations.

As regards the arrangement shown in FIGURE 6 it is possible, without departing from the scope of the invention, to replace the sliding-piston servomotor by a servomotor comprising a rotary vane or blade, the shaft of which carries a rotary cam and against which the rod 25 rests.

What is claimed is:

1. A servo-valve comprising a stationary nozzle which is fed with pressurized fluid to produce a jet; a jet receiver means spaced from the nozzle and defining a pair of pressure chambers each having a receiving orifice facing the nozzle, the receiving orifices being arranged symmetrically to the nozzle axis; a jet deflector device comprising a double-acting deflector member having two sharp edges facing each other in position to intercept the jet between the nozzle and said jet receiver means, a lever member extending substantially parallel to the nozzle axis for supporting said deflector member, said lever member being pivotally mounted by friction-free pivotal means spaced a distance from the deflector member, said pivotal means including a diaphragm having a peripheral corrugation formed therein, said diaphragm being fastened to a stationary part around the corrugation, and means engaging the lever member through a central portion of the diaphragm, and actuating means responsive to an input signal for pivoting the supporting lever and deflector member around said pivotal means to deflect the jet selectively towards either of said receiving orifices to produce a pressure differential output signal between the chambers.

2. A servo-valve comprising a stationary nozzle which is fed with pressurized fluid to produce a jet; a jet receiver means spaced from the nozzle and defining a pair of pressure chambers each having a receiving orifice facing the nozzle, the receiving orifices being arranged symmetrically to the nozzle axis; a jet deflector device comprising a double-acting deflector member having two sharp edges facing each other in position to intercept the jet between the nozzle and said jet receiver means, a lever member extending substantially parallel to the nozzle axis for supporting said deflector member, said lever member being pivotally mounted by friction-free pivotal means spaced a distance from the deflector member, said pivotal means including at least two flexible plates forming a dihedral angle between them, each plate having a portion fixed to a stationary part and a portion fixed to said lever member, and actuating means responsive to an input signal for pivoting the supporting lever and deflector member around said pivotal means to deflect the jet selectively towards either of said receiving orifices to produce a pressure differential output signal between the chambers.

References Cited by the Examiner

UNITED STATES PATENTS

| | | | |
|---|---|---|---|
| 2,241,330 | 5/1941 | Shaw | 91—3 |
| 2,814,487 | 11/1957 | Medkeff | 91—3 |
| 3,099,280 | 7/1963 | Holzbock | 137—83 |
| 3,169,746 | 2/1965 | Moosmann | 137—83 X |

OTHER REFERENCES

Hydraulics and Pneumatics (Holzbock), November 1960, pp. 71–74.

SAMUEL LEVINE, *Primary Examiner.*

FRED E. ENGELTHALER, *Examiner.*

P. T. COBRIN, *Assistant Examiner.*